(No Model.)

A. L. GARFORD.
VELOCIPEDE.

No. 457,435. Patented Aug. 11, 1891.

WITNESSES.
Frank M. Miller.
Albert H. Baks.

INVENTOR.
Arthur L. Garford
By his attorney
E. L. Thurston

UNITED STATES PATENT OFFICE.

ARTHUR L. GARFORD, OF ELYRIA, OHIO.

VELOCIPEDE.

SPECIFICATION forming part of Letters Patent No. 457,435, dated August 11, 1891.

Application filed October 31, 1890. Serial No. 369,927. (No model.)

*To all whom it may concern:*

Be it known that I, ARTHUR L. GARFORD, a citizen of the United States, residing at Elyria, in the county of Lorain and State of Ohio, have invented certain new and useful Improvements in Velocipedes, of which the following is such a full, clear, and exact description as will enable others skilled in the art to which it appertains to make and use the same.

My invention relates to the driving mechanism of velocipedes.

My object is to provide mechanism which may be employed as a substitution for the chain and sprocket wheel connection commonly employed between the crank-shaft and axle of the driving-wheel.

My invention consists in the construction and combination of parts hereinafter described, and definitely pointed out in the claims.

Figure 1:
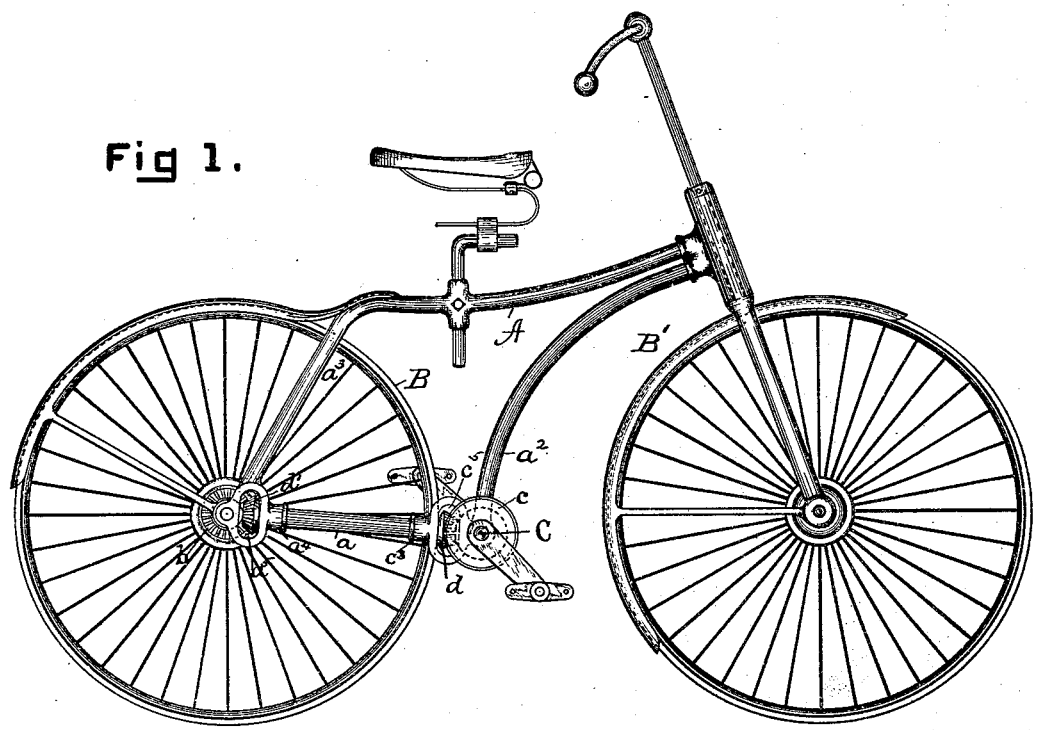
Figure 2:
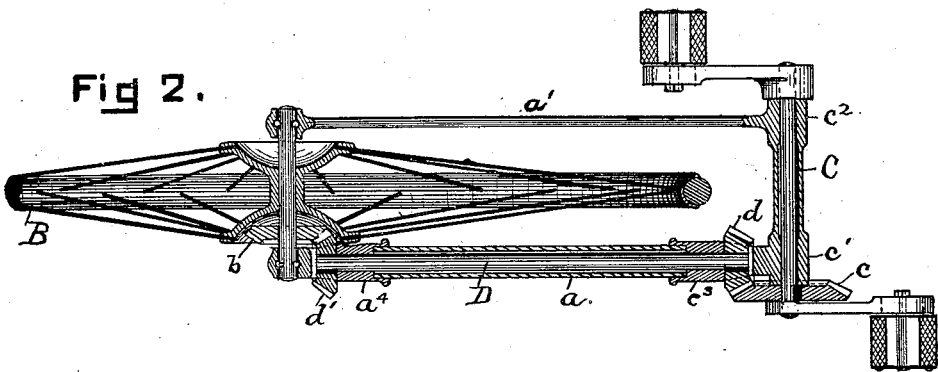

In the drawings, Figure 1 is a side elevation of a "Safety" bicycle having my improved mechanism, and Fig. 2 is a horizontal section on line 2 2 of Fig. 1.

Referring to the parts by letters, A represents the frame of a Safety bicycle, B the rear (and driving) wheel, and B' the front wheel thereof.

C represents the crank-shaft, which is suitably journaled in bearings $c'$ $c'$, supported and braced by the arms $a$ $a'$ $a^2$ of the frame. Keyed or rigidly secured in some other appropriate manner to the axle of the rear wheel B is a bevel-gear $b$, and similarly secured to the crank-shaft is another bevel-gear $c$.

D represents a shaft, which is mounted in suitable bearings in the frame and has secured to its ends the bevel-gears $d$ $d'$, of which the former meshes with the bevel-gear $c$ and the latter with the bevel-gear $b$, above described.

The hub of the driving-wheel B is cupped, as shown, and the bevel-gear $b$ lies almost wholly within the recess thus formed. The bevel-gear $c$ is secured to the crank-shaft outside of the brace $a$, and its teeth are on its inner side. The end of the shaft D nearest the crank-shaft has its bearings in a piece $c^3$, which is cast or forged integral with the crank-shaft bearing $c'$. The end of the shaft D nearest the rear wheel is journaled in a piece $a^4$, formed as an integral part of the piece in which is the bearing of the driving-axle. The part $a^3$ of the frame may be brazed or otherwise secured to this piece $a^4$. The brace $a$ is a tube which surrounds the shaft D, and its ends screw into the bearing-pieces $c^3$ and $a^4$. The shaft D is thus protected from danger of being bent or broken, and its bearings are to a great extent protected from dust.

The bearing-piece $C^3$ is provided with a transverse vertical slot $c^5$, in which lies most of the beveled gear $d$, and the bearing piece $a^4$ is similarly provided with a transverse vertical slot $a^5$, in which lies most of the beveled gear $d'$. By thus slotting the bearing-pieces $C^3$ and $A^4$ a working space for the beveled gears is provided. Most of the gear is protected from injury, and means are provided to which any suitable covering for said gears may be conveniently attached, and at the same time the parts are compactly arranged and the device is comparatively inexpensive.

The most feasible method of differentiating the relative rates of revolution of the crank-shaft and driving-axle is by increasing the diameter of the bevel-gear $c$. As shown in the drawings, this bevel-gear is the largest of the four bevel-gears employed, and the said bevel-gears bear such relation to each other that the rear wheel makes three revolutions while the crank-axle makes two.

Having thus described my invention, what I claim as new, and desire to secure by Letters Patent, is—

1. In a velocipede, in combination, the driving-axle, a wheel having a cupped hub secured thereto, a bevel-gear secured to said axle and lying in the recess in said hub, the crank-axle and a bevel-gear secured thereto, a shaft, bevel-gears secured on each end thereof, and bearings for said shaft secured to the velocipede-frame, substantially as and for the purpose specified.

2. In a velocipede, in combination, the driving-axle and a bevel-gear secured thereto, the crank-axle and a bevel-gear secured thereto, two pieces rigidly secured to the velocipede-frame, one near the crank-shaft and one near the driving-shaft, each of said bearing-pieces having transverse vertical slots, a shaft mounted in said bearing-pieces, and two bevel-gears secured to the ends of said shaft and extending through said slots and meshing with the bevel-gears on the crank-shaft and driving-axle, respectively, substantially as and for the purpose specified.

ARTHUR L. GARFORD.

Witnesses:
SAML. S. ROCKWOOD,
C. M. BRAMAN.